W. A. WHITNEY.
UNIVERSAL JOINT.
APPLICATION FILED JULY 30, 1908.
1,022,909.
Patented Apr. 9, 1912.
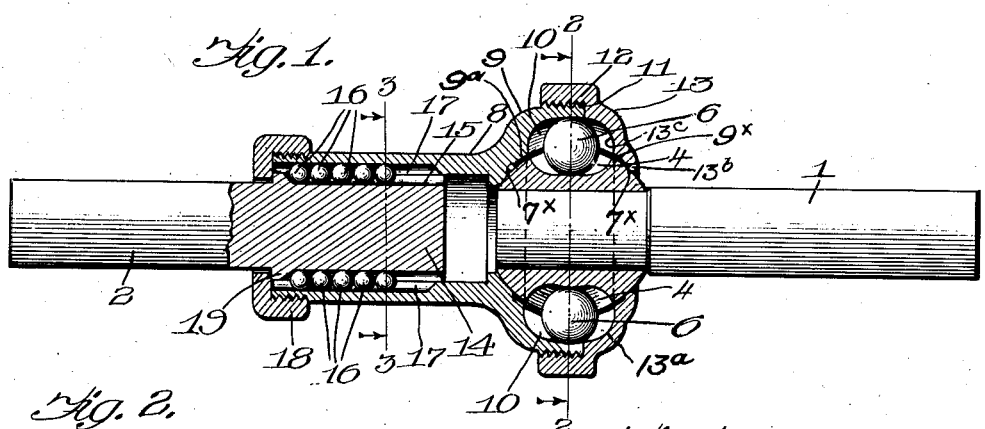
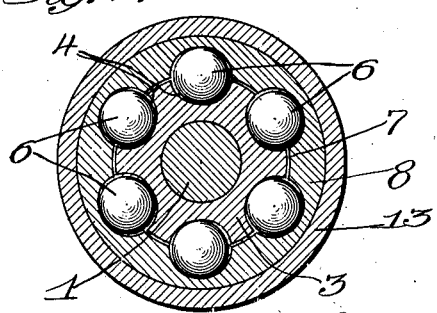
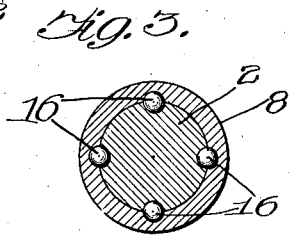
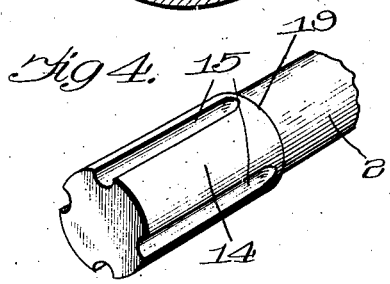
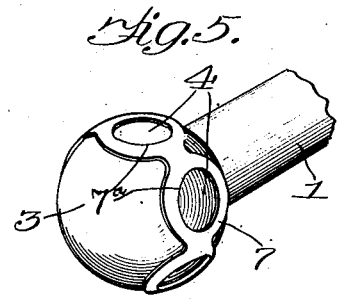
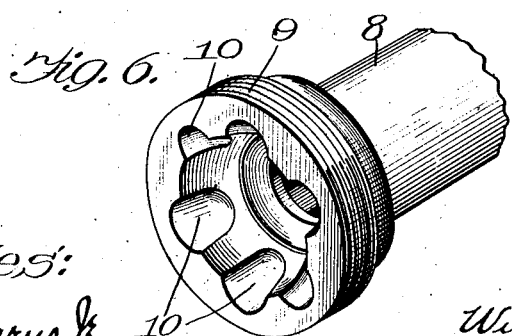
Witnesses:
G. V. Domarus Jr.
Jno. H. Nelson Jr.
Inventor:
William A. Whitney
By Luther L. Miller
Atty.

UNITED STATES PATENT OFFICE.

WILLIAM A. WHITNEY, OF ROCKFORD, ILLINOIS.

UNIVERSAL JOINT.

1,022,909.    Specification of Letters Patent.    Patented Apr. 9, 1912.

Application filed July 30, 1908. Serial No. 446,055.

*To all whom it may concern:*

Be it known that I, WILLIAM A. WHITNEY, a citizen of the United States, residing at Rockford, in the county of Winnebago and State of Illinois, have invented certain new and useful Improvements in Universal Joints, of which the following is a specification.

This invention relates to a universal joint for connecting a driving shaft and a driven shaft.

One of the objects of the invention is to provide an efficient means for connecting the ends of two alining shafts whereby one may be driven from the other and in such a manner that one or both of the shafts may be mounted in movable bearings.

Another object of the invention is to provide means for permitting longitudinal movement of one of the shafts with respect to the other.

The invention is primarily intended for use in connection with the driving means of a motor vehicle, but it is obvious that it may be utilized with any device where it is desirable to provide driving and driven elements and connect them with a flexible joint.

In the drawings, Figure 1 is a longitudinal sectional view through a universal joint constructed in accordance with my invention. Fig. 2 is a sectional view on the line 2 2 of Fig. 1. Fig. 3 is a sectional view on the line 3 3 of Fig. 1. Fig. 4 is a detail perspective view of one end of the driven shaft. Fig. 5 is a detail perspective view of one end of the driving shaft; and Fig. 6 is a detail perspective view of the socket member of the universal joint to receive the headed end of the shaft shown in Fig. 5.

In the accompanying drawings, 1 designates a driving shaft and 2 the driven shaft. On the end of the driving shaft 1 is a spherical head or enlargement 3 having a plurality of recesses or grooves 4 in its periphery. These grooves 4 are elongated in the direction of the length of the shaft 1 and they receive locking devices in the form of antifriction balls 6.

Coöperating with the head 3 of the shaft 1 is a complementary member comprising a sleeve 8 having an enlarged socket 9 in the form of a flange at one end thereof and this flange is provided with grooves 10 which register with those in the head 3. The periphery of the flange 9 is threaded at 11 and receives the internally threaded annular flange portion 12 of the removable collar 13 which holds the head 3 in the socket 9. The collar 13 comprises three portions, viz: the threaded flange 12, a portion 13$^b$ fitting about the head 3 and an intermediate annular, dome-like portion 13$^a$ between the two first mentioned portions, said dome-like portion having an internal annular groove completing the grooves 10 in the socket 9. By reason of the groove 13$^c$ being of annular form instead of separate grooves similar to those in the socket member 9, the collar 13 may be turned up on the threaded portion 11 in assembling the device, until the collar stops, it being unnecessary to position the collar in any definite relation to the socket in order to bring the groove 13$^c$ into register with the grooves 10.

7 is a ball spacer having openings 7$^a$ therein to receive the balls 6, said openings being slightly elongated in a direction transversely of the shaft, as shown in Fig. 5, to permit the balls to approach each other when the joint is flexed. One edge of the ball spacer 7 lies in a recess 9$^a$ in the socket 9 and the other edge of said ball spacer lies in a corresponding recess 9$^x$ formed in the collar 13, so that when said collar is secured in position, the shoulders 7$^x$ formed by said recesses 9$^a$ and 9$^x$ limit the movement of said spacer when the joint is flexed, whereby the balls are held in a central position to prevent binding in flexing the joint. To make the joint operate more smoothly, a slight clearance may be provided between the balls 6 and the sides of their respective grooves or pockets. In Fig. 2, this clearance is shown considerably exaggerated.

The collar 13 constitutes a locking device to prevent the longitudinal displacement of the member 8 with respect to the member 3. However, when the collar 13 is screwed in place as shown in Fig. 1, a flexible joint is provided which permits considerable latitude of movement between the members 3 and 8.

Projecting into the sleeve 8 is a longitudinally-grooved end 14 of the shaft 2. The longitudinal grooves 15 in said shaft are adapted to receive locking devices comprising balls 16, said balls fitting in corresponding grooves 17 in the sleeve 8 and being held against displacement by a collar 18 on the end of the sleeve 8 (see Fig. 1). These locking devices 16 permit of an easy longitudinal movement of the shaft 2 within the sleeve 8, or a longitudinal movement of the sleeve 8 on the shaft 2, but any axial movement of either the sleeve 8 or the shaft 2 with respect to each other will be prevented. 19 is an annular collar on the driven shaft 2 adapted to limit the longitudinal movement of said shaft in one direction by contacting with the collar 18.

I claim as my invention.

1. A universal joint comprising a member provided with a socket, a second member provided with a ball located within said socket, said socket and said ball being provided with complemental grooves, balls in said grooves, and a removable collar surrounding the first mentioned ball, said collar having a portion engaging the first mentioned ball, an annular flange threaded on said socket, and an intermediate, annular, dome-like portion having an internal annular groove which completes said complemental grooves.

2. A universal joint comprising a member provided with a socket, a second member provided with a ball located within said socket, said socket and ball being provided with complemental grooves, balls in said grooves, a ball spacer surrounding the first mentioned ball, and a collar removably secured to said socket member, said socket and said collar being shaped so as to limit movement of said ball spacer when the joint is flexed.

3. A universal joint comprising a member provided with a socket, a second member provided with a ball located within said socket, said socket and ball being provided with complemental grooves, balls in said grooves, a ball spacer surrounding the first mentioned ball, and a collar removably secured to said socket member, said socket and said collar being provided with shouldered recesses to receive opposite edges of said ball spacer.

4. A universal joint comprising a sleeve provided with internal longitudinal grooves and having one end enlarged to form a socket, a shaft fitting within said sleeve and provided with peripheral longitudinal grooves arranged to register with the first mentioned grooves, balls lying in the respective grooves, a shoulder on said shaft, a nut threaded on the end of said sleeve and adapted to engage said shoulder for limiting the relative longitudinal movement of said sleeve and said shaft, a second shaft provided with a ball fitting within said socket, said ball and said socket being provided with complemental grooves, balls in said grooves, and a removable collar inclosing said ball and having a portion engaging said ball and an annular flange threaded on said socket, said collar being provided with a dome-like portion between said threaded portion and the portion bearing against said ball, said dome-like portion having an internal annular groove which completes said complemental grooves.

WILLIAM A. WHITNEY.

Witnesses:
N. P. NELSON,
HENRY REYNOLDS.